Patented Apr. 16, 1929

1,709,503

UNITED STATES PATENT OFFICE.

EDOUARD URBAIN, OF PARIS, FRANCE.

DECOLORIZING CARBON.

No Drawing.   Application filed March 29, 1926, Serial No. 98,375, and in France March 12, 1925.

In a previous application the inventor has indicated a general process for the preparation of active carbons, available for use as absorbing agents or decolorizing agents.

These carbons, however, cannot always completely answer certain special requirements, as, for example, the requirements of sugar refineries, of the wine making industry, etc.

For this reason, the inventor has been induced to make researches as to the possibility of manufacturing special products for these industries, starting out from principles similar to those which have served as a basis for the process for the preparation of active carbon mentioned above.

This invention consists in mixing any vegetable substance, or substance of vegetable origin, as for instance, peat, wood, straw, vegetable ivory nuts, starch, glucose, lignite, etc., which has been previously reduced to powder, with dicalcium phosphate, which has likewise been ground, and with sulphuric acid.

After the mixing, the pasty mass obtained is agglomerated by any available means, for instance extruded by means of a continuous or intermittent operating press.

It is thereupon granulated, if necessary, and then dried and calcined. At the beginning of the calcination, sulphuric carbonization occurs, the sulphuric acid being eliminated in the form of steam and sulphurous acid.

The phosphoric acid formed displaces thereupon the sulphuric acid of the sulfate of calcium which was formed and finally there is effected the elimination of hydrogen, phosphorous and hydrogen phosphides.

The residue from the calcination is an active carbon of geometric form, charged with tricalcic phosphate. This product, after cooling and screening, if necessary, is much more active than the granular animal black, and can be used, for instance, in the sugar refineries with the same material as that used for operating with crushed animal charcoal.

In order to prepare a carbon which can be used under the same conditions as the product known under the name of paste-black, obtained by washing animal charcoal, the granulated carbon obtained in the manner indicated above is crushed, washed with hydrochloric acid and thereupon washed with water on a filter.

The moist paste thus obtained is greatly superior to the paste-black.

One can obtain decolorizing blacks in powder of an excellent quality by drying this paste and by screening or bolting the dry powder, in order to obtain the degree of fineness desired, in accordance with the respective purposes.

The agglomeration of the initial paste after softening by kneading or rubbing, in case the final product is to be in the form of powder, has for its purpose to facilitate the calcination. This, however, is not essential and the invention under consideration may also be used for the manufacture of carbons in powder or in paste form by the chemical process described above, without making use of any agglomeration in the course of manufacture.

For certain applications or uses, the products may be used in the form of powder or paste without washing with hydrochloric acid and water, and in certain cases one may even omit the addition of sulphuric acid to the mixture of raw materials and of dicalcic phosphate.

What I claim is:

The method of producing decolorizing carbons which consists in mixing together finely powdered vegetable matter, powdered dicalcium phosphate and sulphuric acid, shaping the mixture and calcining with an elimination of hydrogen, phosphorus and hydrogen phosphides.

EDOUARD URBAIN. [L. S.]